Patented Dec. 30, 1941

2,268,158

UNITED STATES PATENT OFFICE 2,268,158

ESTERS OF GAMMA OXOPHOSPHONIC ACIDS

Carl S. Marvel, Urbana, Ill.

No Drawing. Application May 5, 1939,
Serial No. 272,014

8 Claims. (Cl. 260—461)

This invention has as an object the preparation of esters of aliphatic gamma-oxophosphonic acid. A further object is the preparation of modifying agents for internal combustion engine fuels. Another object is the preparation of new addition agents for lubricating oils. Other objects will appear hereinafter.

These objects are accomplished by the following invention which comprises organic compounds containing pentavalent phosphorus directly attached to a carbon atom in an aliphatic chain in the position beta to an oxo-substituted carbon, directly attached by two of its valences to one oxygen atom and directly attached by at least one other valence to amino nitrogen, ester oxygen, or carbon.

The main subclasses of the present invention are the esters of aliphatic gamma-oxophosphonic acids, the amides of aliphatic gamma-oxophosphonic acids, aliphatic gamma-oxo-oxyphosphines, and aliphatic gamma-oxophosphonic monobasic acids.

The esters and amides of aliphatic gamma-oxophosphonic acids are obtained by the reaction of alcohols, phenols, ammonia, and primary and secondary amines with the intermediate phosphonyl chlorides resulting from the reaction of phosphorus trichloride, or a mono- or dichlorophosphine on aliphatic alpha, beta-unsaturated ketones or aldehydes. The aliphatic gamma-oxophosphonic monobasic acids and phosphine oxide derivatives are obtained by the reaction of mono- or dichlorophosphines on aliphatic alpha, beta-unsaturated ketones or aldehydes.

While the invention is not to be restricted by theoretical considerations, the probable mechanism of the reaction between aliphatic alpha, beta-unsaturated ketones or aldehydes and phosphorus trichloride or tribromide is the formation of an intermediate cyclic phosphonic acid chloride or bromide which by the action of alcohols or phenols or ammonia or primary or secondary amines is converted to an ester or amide. The proposed mechanism of the reactions leading to esters may be illustrated with 4-methylpent-3-en-2-one as follows:

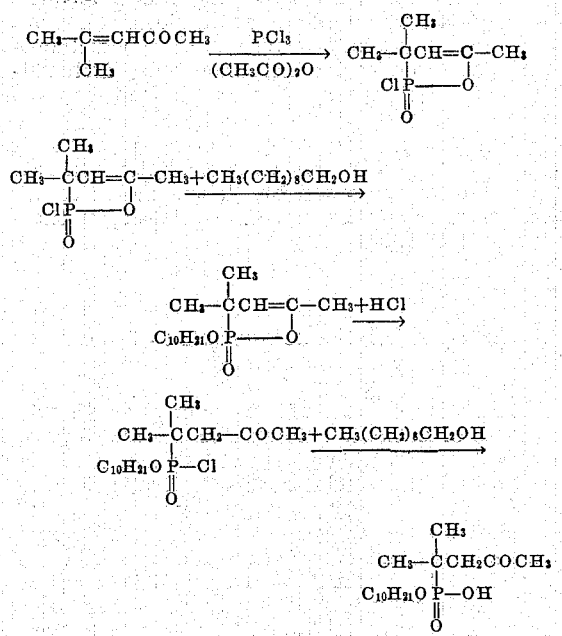

When ammonia or primary amines or secondary amines are used in place of alcohols or phenols the products are amides of the gamma-oxophosphonic acids.

If in the reaction of 4-methylpent-3-en-2-one, dimethoxychlorophosphine is substituted for the phosphorus trichloride, the reaction mechanism is as follows:

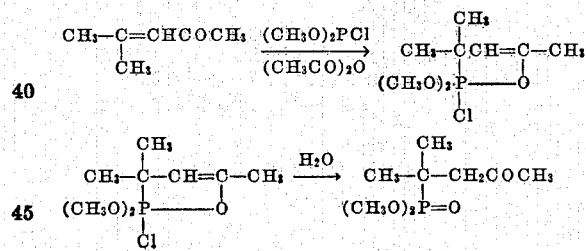

This is a very satisfactory method for making the neutral esters. In place of dimethoxychlorophosphine, di - beta - naphthyloxychlorophosphine, dicresyloxychlorophosphine, dioctyloxychlorophosphine, dicyclohexyloxychlorophosphine, mono-ethoxydichlorophosphine, monophenoxydichlorophosphine, monodecyloxydichlorophosphine, etc., may be used.

If in the reaction of 4-methylpent-3-en-2-one, a dichlorophosphine such as n-butyldichlorophosphine (n—C₄H₉PCl₂) is substituted for the phosphorus trichloride, the reaction mechanism is as follows:

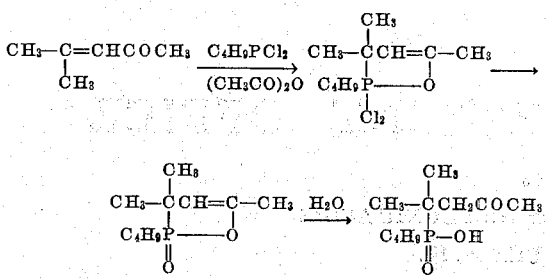

When alcohols or phenols are reacted with the cyclic phosphonic acid chloride, esters are formed; when ammonia or primary amines or secondary amines are used in place of alcohols or phenols, the products are amides. In place of the butyl dichlorophosphine, penyldichlorophosphine, dodecyldichlorophosphine, diphenylmonochlorophosphine, diamylmonochlorophosphine, etc., may be employed.

The more detailed practice of the invention is illustrated by the following examples, wherein parts given are by weight. There are of course many forms of the invention other than these specific embodiments.

EXAMPLE I

*Potassium-n-butyl-4-methylpentan - 2 - one - 4 - phosphonate*

A reaction mixture of 3 parts of mesityl oxide, 5 parts of n-butyldichlorophosphine and 3 parts of acetic anhydride is allowed to stand for 24 hours in a glass reaction vessel. Evaporation at 70° C. and 20 mm. leaves a sticky residue which is taken up in 25 parts of 10% sodium hydroxide solution and extracted continuously with ether for about 24 hours. The free acid is liberated with dilute sulfuric acid, collected in ether, dried over anhydrous magnesium sulfate, and filtered, and the solvent removed by heating on a steam cone. The residual sticky material weighs 5 parts after drying in a desiccator.

This n - butyl-4-methylpentan-2-one-4-phosphonic acid is taken up in water and treated with 1.5 parts of potassium hydroxide to give a solution which is neutral to litmus. Any free acid or anhydride is removed by extraction with ether. The water is removed by addition of benzene and slow distillation. The residual potassium salt is very hygroscopic. Analysis: Calculated for C₁₀H₂₀KO₃P: P, 12.0. Found: P, 12.2, 12.3.

The structure of the potassium salt is considered to be (CH₃)₂—C—CH₂COCH₃
        |
      O=P—OK
        |
       C₄H₉

EXAMPLE II

*Diphenyl 4-methylpentan-2-one-4-phosphonate*

A mixture of 4 parts of mesityl oxide and 10 parts of diphenoxychlorophosphine is allowed to stand at 25° C. for one hour. Then 5 parts of glacial acetic acid is added, and the reaction mixture set aside for two days. At the expiration of this time, ether is added and the resulting ether solution extracted twice with 10% sodium hydroxide solution. The ether solution is then dried and the solvent removed. On distilling the residue, 5.4 parts (41% yield) of the diphenyl ester, B. P. 136–150° C. at 0.0008 mm.; $n^{20}_D$ 1.5531 is obtained. This ester is soluble in paraffin oil. Analysis: Calculated for C₁₈H₂₁O₄P: P, 9.34. Found: P, 9.53, 9.50.

EXAMPLE III

*n-Butyl 4-methylpentan-2-one-4-phosphonate*

A mixture of 9.8 parts of mesityl oxide, 15 parts of phosphorus trichloride, and 10 parts of acetic anhydride is allowed to stand for two hours and then the volatile material is removed by heating to 70° C. under 18 mm. pressure. The residue is treated with a solution of 2.3 parts of sodium in 17 parts of n-butyl alcohol and excess ether. The ether is removed by distillation and the residue warmed at 100° C. for 3 hours. The resulting oil is taken up in ether, washed with 10% sodium carbonate solution, 10% sulfuric acid solution, and finally water. After drying the ether solution over anhydrous magnesium sulfate and filtering, the solvent is removed. Five parts of light yellow oil remains and is distilled. There is thus obtained 4.7 parts (20% yield of n-butyl 4-methyl-pentan-2-one-4-phosphonate, B. P. 82–100° C. at 0.0002 mm.; $n^{20}_D$, 1.459; $d^{20}_4$, 1.110. Analysis: Calculated for C₁₀H₂₁O₄P: P, 13.15. Found: P, 13.15; 12.85.

This compound has the following structure:

(CH₃)₂C—CH₂COCH₃
        |
     C₄H₉OP—OH
        ‖
        O

Instead of the butyl alcohol of the above example, there may be used any alcohol or phenol including methanol, ethanol, isobutanol, hexan-1-ol, 2-ethylhexan-1-ol, decan-1-ol, dodecan-1-ol, tetradecan-1-ol, beta-methoxyethanol, hexadecan-1-ol, octadecan-1-ol, octadec-9-en-1-ol, pentadecan-8-ol, the mixture of alcohols resulting from the catalytic hydrogenation or sodium reduction of natural oils such as coconut oil, sperm oil, etc.; the mixture of alcohols obtained in the catalytic synthesis of methanol from carbon oxides and hydrogen, phenol, the cresols, the naphthols, benzyl alcohol, cyclohexanol, naphthenyl alcohols, etc. The aliphatic alcohols are preferred to the aromatic phenolic compounds for the preparation of esters.

EXAMPLE IV

*n-Decyl 4-methylpentan-2-one-4-phosphonate*

Following the procedure described in Example III, 49 parts of mesityl oxide, 69 parts of phosphorus trichloride, 51 parts of acetic anhydride and 158 parts of 1-decanol yielded 4 parts of n - decyl 4-methylpentan-2-one-4-phosphonate; B. P. 104–145° C. at 0.0001 mm.; $n^{20}_D$ 1.4580; $d^{20}_4$, 0.9800. Analysis: Calculated for C₁₆H₃₂O₄P: P, 9.7. Found: P, 9.50, 9.40.

In a similar manner, 1-tetradecanol and 1-hexadecanol are also esterified but on distillation of the crude esters at very low pressures decomposition sets in. For most of the technical uses the undistilled esters are satisfactory especially if they are purified by warming under vacuum to remove volatile products and then washing with dilute sodium carbonate solution, dilute sulfuric acid solution and finally with water.

EXAMPLE V

Didecyl butan-2-one-4-phosphonate

By treatment of 3.5 parts of methyl vinyl ketone with 6.8 parts of phosphorus trichloride and 5 parts of acetic anhydride and addition after 2 days of 7.9 parts of 1-decanol in 37 parts of chloroform, didecyl butan-2-one-4-phosphonate is obtained on distillation. The yield is 0.4 part of ester boiling at 120–170° C. at 0.0001 mm.; $n^{20}_D$, 1.4528; $d^{20}_4$, 0.9287. Analysis: Calculated for $C_{24}H_{49}O_4P$: P, 7.17. Found P, 7.10, 6.95.

EXAMPLE VI

Diphenyl butan-2-one-4-phosphonate

Three and one half parts of methyl vinyl ketone and 8.2 parts of diphenoxychlorophosphine are reacted by a procedure similar to that described in Example II. On distillation there is obtained 1.3 parts of diphenyl butan-2-one-4-phosphonate; B. P. 95–112° C. at 0.0003 mm.; $n^{20}_D$, 1.5575; $d^{20}_4$, 1.222. Analysis: Calculated for $C_{16}H_{17}O_4P$: P, 10.2. Found: P, 9.38, 10.1.

EXAMPLE VII

Diphenyl butan-1-al-3- phosphonate

When crotonaldehyde and diphenoxychlorophosphine are processed under the conditions described in Example II a 27% yield of diphenyl butan-1-al-3-phosphonate is obtained.

EXAMPLE VIII

4-methylpentan-2-one-4-phosphanilide

Mesityl oxide (58.8 parts) and acetic anhydride (60 parts), are mixed in a reaction vessel and 90 parts of phosphorus trichloride are added slowly with agitation, the temperature being maintained at 30–40° C. The mixture is agitated for four hours, let stand over night, then heated at 50–70° C. at 15 mm. pressure to remove volatile material. The reddish colored residue, 25 parts, is dissolved in 70 parts anhydrous ethyl ether to form a cloudy solution to which 50 parts of freshly distilled aniline is slowly added. The semisolid precipitate formed is let stand over night, ether removed by evaporation, the residue extracted first with water, then with ether, then with benzene. The residue is then dissolved in absolute ethanol, boiled with charcoal, filtered, and then evaporated. The 4-methylpentan-2-one-4-phosphanilide is isolated as a reddish resin amounting to 9.5 parts. The halogen free anilide is insoluble in water, ether, and benzene.

Instead of the aniline of the above example, any primary or secondary amine or ammonia may be used including methylamine, ethylamine, isobutylamine, diethanolamine, piperidine, cyclohexylamine, ethylaniline, dioctylamine, the toluidines, hexyl-1-amine, 2-ethylhexyl-1-amine, decyl-1-amine, dodecyl-1-amine, tetradecyl-1-amine, hexadecyl-1-amine, octadecyl-1-amine, octadec-9-enyl-1-amine, pentadecyl-8-amine, the amines resulting from the amination of the mixture of alcohols obtained in the catalytic synthesis of methanol from carbon oxides and hydrogen, benzylamine, naphthenylamines, furfurylamine, etc.

Any aliphatic alpha, beta-unsaturated ketone or aldehyde is a suitable intermediate for the preparation of the esters, amides and oxyphosphine derivatives of the aliphatic gamma-oxophosphonic acids of this invention. The ketones are, in general, preferred to the aldehydes. A few examples of aliphatic alpha, beta-unsaturated ketones and aldehydes suitable for use in this invention are: acrolein; crotonaldehyde; 2-methylprop-2-en-1-al; octa-2,4,6-trien-1-al; non-2-en-1-al; 2-ethylhex-2-en-1-al; oct-2-en-1-al; 2-methylbut-2-en-1-al; 2-methylpent-2-en-1-al; 2-ethylbut-2-en-1-al; 2-pentylnon-2-en-1-al; phorone; ethyl vinyl ketone; isopropyl vinyl ketone; 10-ethyltetradec-8-en-7-one; 5,11-diethylpentadec-6,9-dien-8-one; 2-methylhexadec-3-en-5-one; pentadec-7-en-9-one; 5-ethyltetradec-6-en-8-one; 7-methylpentadec-7-en-9-one; 2-methylheptadec-5-en-4-one; 2-methyldodec-5-en-4-one; 2,8,12-trimethyltridec-5,7,11-trien-4-one; 2-methyl-8-ethyldodec-3-en-5-one; 5-ethylhexadec-9-en-8-one; 3-ethyltetradec-7-en-6-one; 3,9-diethyltridec-4-en-6-one; 9-ethyltridec-4-en-6-one; 9-ethyltridec-4,7-dien-6-one; 6-propyl-8-ethyl-dodec-6-en-5-one; 9-ethyl-5-methyltridec-4,7-dien-6-one; 9-ethyl-5-methyltridec-7-en-6-one; etc.

The esters of aliphatic gamma-oxophosphonic acids have the following general formula:

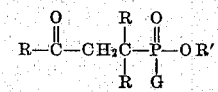

in which R is hydrogen or an aliphatic radical and preferably an aliphatic hydrocarbon radical; R' is an organic radical having its free valence attached to carbon; G is —OH, —OR' or —OM in which M is a salt-forming atom or group. A few illustrations of R' are the radicals of the following alcohols: methanol, ethanol, isobutanol, hexan-1-ol, 2-ethylhexan-1-ol, decan-1-ol, dodecan-1-ol, tetradecan-1-ol, beta-methoxyethanol, hexadecan-1-ol, octadecan-1-ol, octadec-9-en-1-ol, pentadecan-8-ol, the mixture of alcohols resulting from the catalytic hydrogenation or sodium reduction of natural oils such as coconut oil, sperm oil, etc.; the mixture of alcohols obtained in the catalytic synthesis of methanol from carbon oxides and hydrogen, phenol, the cresols, the naphthols, benzyl alcohol, cyclohexanol, naphthenyl alcohols, etc. The aliphatic alcohols are preferred to the aromatic phenolic compounds for the preparation of esters. M is preferably hydrogen, sodium, potassium and ammonium but may also be calcium and magnesium and, in fact, any salt-forming radical including as such the metal cations and the ammonium radicals from amines, e. g., dimethylamine, ethylamine, diethanolamine, triethanolamine, butylamine, glucamine, methyl glucamine, pyridine, piperidine, cyclohexylamine, aniline, the toluidines, hexamethylenediamine, decamethylenediamine, ethylenediamine, etc.

The amides of aliphatic gamma-oxophosphonic acids have the following general formula

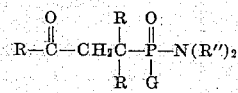

in which R'' is hydrogen or an organic radical as illustrated above for R', G is —OR'' or —N(R'')$_2$, or OM in which M is a salt-forming atom or group and R is hydrogen or an aliphatic radical and preferably an aliphatic hydrocarbon radical.

The oxyphosphine derivatives have the following general formula:

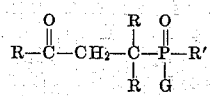

in which R' is an organic radical having its free valence attached to carbon and is preferably a hydrocarbon radical; G is R', —OR'', —OM; —N(R'')₂ in which M is a salt-forming atom or group and R'' is hydrogen or R'; and R is hydrogen or an aliphatic radical and preferably an aliphatic hydrocarbon radical.

Although it is preferred to carry out the reaction between the aliphatic alpha, beta-unsaturated carbonyl compounds with the phosphorus trichloride, tribromide or mono- or dichloro- or mono- or dibromophosphine in the presence of acetic acid or anhydride, any low molecular weight carboxylic acid or anhydride will suffice, which does not react directly with the halophosphines under the conditions of the general reaction. Acetic anhydride is preferred when the intermediate phosphonyl chloride is desired, as is the case in the preparation of the esters or amides. It is recognized that the acid or anhydride employed as the medium in which the reaction takes place, functions not only as a solvent, but is chemically involved in the reaction which takes place, probably by reacting with a loose complex formed between the halophosphine and the carbonyl compound. In this manner, higher yields of the final products are obtained. However, the presence of such an acid or anhydride is not essential, since low yields of gamma-oxophosphonic acid derivatives may be obtained merely by combining the halophosphine with an aliphatic alpha, beta-unsaturated ketone or aldehyde, and hydrolyzing the mixture directly with water.

Any tervalent phosphorus bromide or chloride wherein all the valences of the phosphorus are satisfied by single bonds may be used including phosphorus tribromide, trichloride, dimethoxychlorophosphine, di-beta-naphthyloxychlorophosphine, dicresyloxychlorophosphine, dioctyloxychlorophosphine, dicyclohexyloxychlorophosphine, mono-ethoxydichlorophosphine, monophenoxydichlorophosphine, monodecyloxydichlorophosphine, butyl dichlorophosphine, phenyldichlorophosphine, dodecyldichlorophosphine, diphenylmonochlorophosphine, diamylmonochlorophosphine, diphenoxychlorophosphine, butyldibromophosphine, etc.

Wide variations may be used in the relative proportions of reactants employed in the syntheses of the gamma-oxophosphonic acid derivatives of this invention. Depending upon considerations of cost and availability, molecular equivalent quantities of ketone and halophosphine or phosphorus trihalide may be used, or even excess proportions of either reactant. It is preferred, however, to use molecularly equivalent quantities of the ketone and acetic anhydride together with a slight excess of halophosphine. When acetic acid is employed, at least two molecular quantities are desirable. The reaction temperature may vary widely over a considerable range, the upper limit of which is chiefly determined by the temperature at which the acid or anhydride employed begins to react with the halophosphine or phosphorus trihalide directly.

The preferred temperature for optimum results with acetic anhydride is the range of 20–50° C. Higher temperatures are sometimes effective in bringing about reaction with relatively inert carbonyl compounds but at the same time frequently result in a darkening and slight resinification of the reaction mixture. In general, the halophosphines react more slowly than phosphorus trichloride. The esterification and amidation reactions of the intermediate phosphonyl halides are usually carried out at temperatures of about 100° C. but higher temperatures may be used. When volatile reactants such at methanol, ammonia, etc. are used at these elevated temperatures, it is usually desirable to carry out the reaction in a closed vessel.

The products of this invention are essentially aliphatic in nature and, in general, tend to be noncrystalline or low melting in character, thereby enhancing their compatibility characteristics with aliphatic hydrocarbons. The higher molecular weight compounds containing a water solubilizing phosphonate group are similar to the soaps of the higher molecular weight fatty acids which are dependent upon an aliphatic "lipophile" radical for their capillary-active characteristics.

The esters, amides and oxyphosphine derivatives of the aliphatic gamma-oxophosphonic acids are useful as addition agents for modifying the properties of fuels for internal combustion engines and lubricating oils.

The products of this invention of 8 or more carbon atoms, which by reason of a free acid group or its equivalent salt, are soluble in water, belong to the class of surface-active or capillary-active materials in that they have colloidal properties and may, therefore, be used advantageously in any process involving wetting, penetrating, deterging, dispersing emulsifying, frothing, foaming and kindred phenomena. Since the high molecular weight products of this invention have surface-tension lowering properties, they may be utilized in many of the techanical applications of surface-active compounds, which are described in an application of Downing and Johnson, Serial No. 200,530, filed April 6, 1938.

The above description and examples are intended to be illustrative only. Any modification of or variation therefrom which conforms to the spirit of the invention is intended to be included within the scope of the claims.

I claim:

1. An ester of an aliphatic gamma oxophosphonic acid having the following general formula:

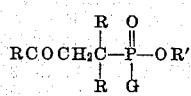

wherein R is a member of the class consisting of hydrogen and monovalent aliphatic radicals, R' is a monovalent organic radical having its free valence attached to carbon, and G is a member of the class consisting of hydroxyl and salts and esters thereof.

2. An ester of an aliphatic gamma oxophosphonic acid.

3. An ester of an aliphatic gamma oxophosphonic acid of at least 8 carbon atoms having the following general formula

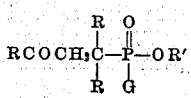

wherein R is a member of the class consisting of hydrogen and monovalent aliphatic radicals, R' is a monovalent organic radical having its free valence attached to carbon, and G is a member of the class consisting of hydroxyl and salts and esters thereof.

4. An ester of an aliphatic gamma oxophosphonic acid of at least eight carbon atoms.

5. Process which comprises reacting an alpha, beta-unsaturated ketone with a member of the class consisting of bromides and chlorides of tervalent phosphorus, all valences of which not satisfied by halogen are satisfied by members of the class of monovalent hydrocarbon radicals directly attached to the phosphorus atom and monovalent hydrocarbon radicals attached thru an oxygen atom to the phosphorus atom, and thereafter reacting the intermediate product with a member of the class consisting of alchols and phenols.

6. Process which comprises reacting an alpha, beta-unsaturated ketone of at least eight carbon atoms with a member of the class consisting of bromides and chlorides of tervalent phosphorus, all valences of which not satisfied by halogen are satisfied by members of the class of monovalent hydrocarbon radicals directly attached to the phosphorus atom and monovalent hydrocarbon radicals attached thru an oxygen atom to the phosphorus atom, and thereafter reacting the intermediate product with a member of the class consisting of alcohols and phenols.

7. n-Decyl 4-methylpentan-2-one-4-phosphonate.

8. Diphenyl butan-1-al-3-phosphonate.

CARL S. MARVEL.